March 31, 1936.  S. Z. DE FERRANTI  2,035,691
SPINNING, DOUBLING, AND TWISTING MACHINERY
Filed Dec. 31, 1934   9 Sheets-Sheet 1

INVENTOR:
S. Z. de Ferranti (deceased)
by G. R. Z. de Ferranti
(administratrix)

By: Glascock Downing Seebold
Attys.

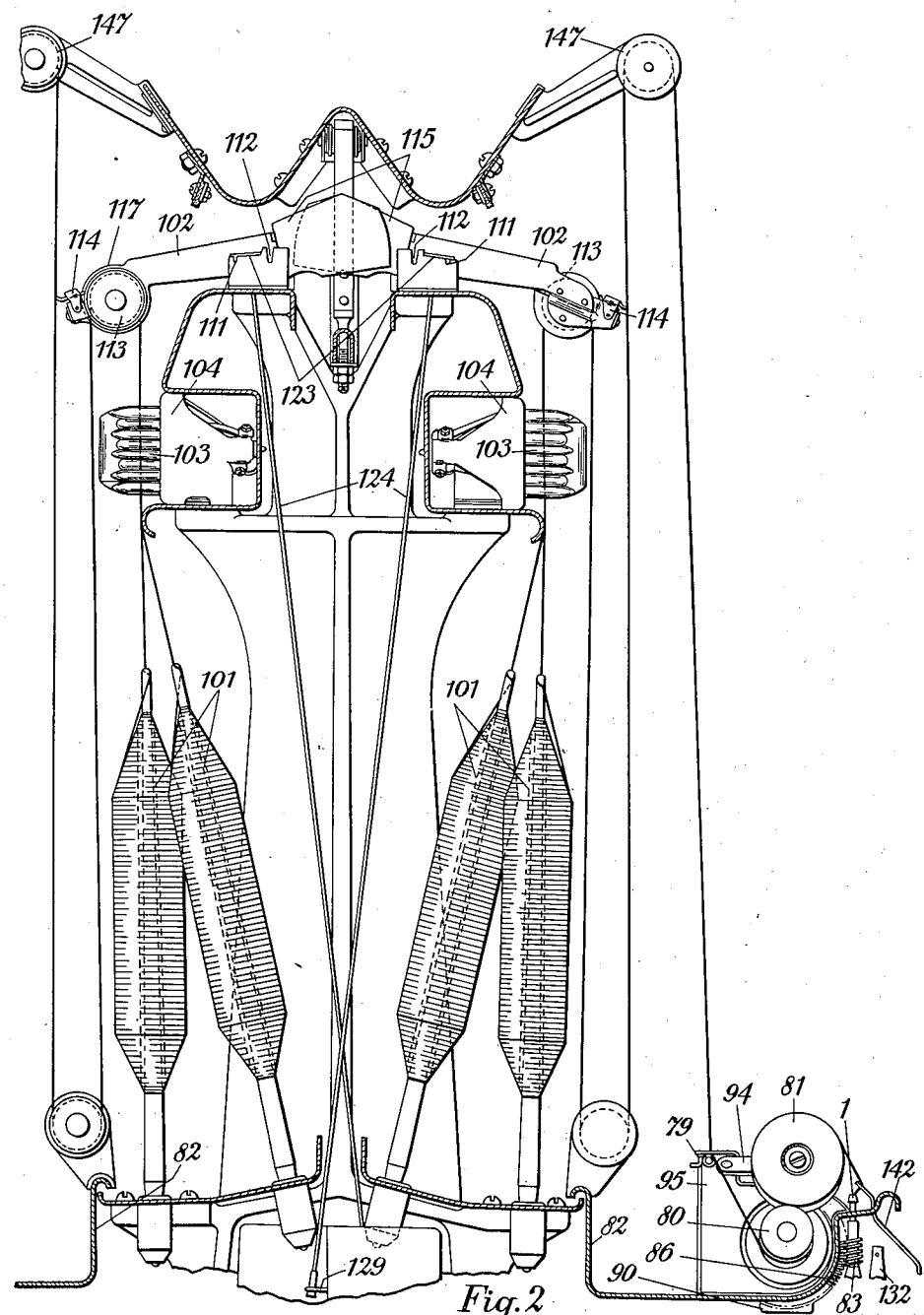

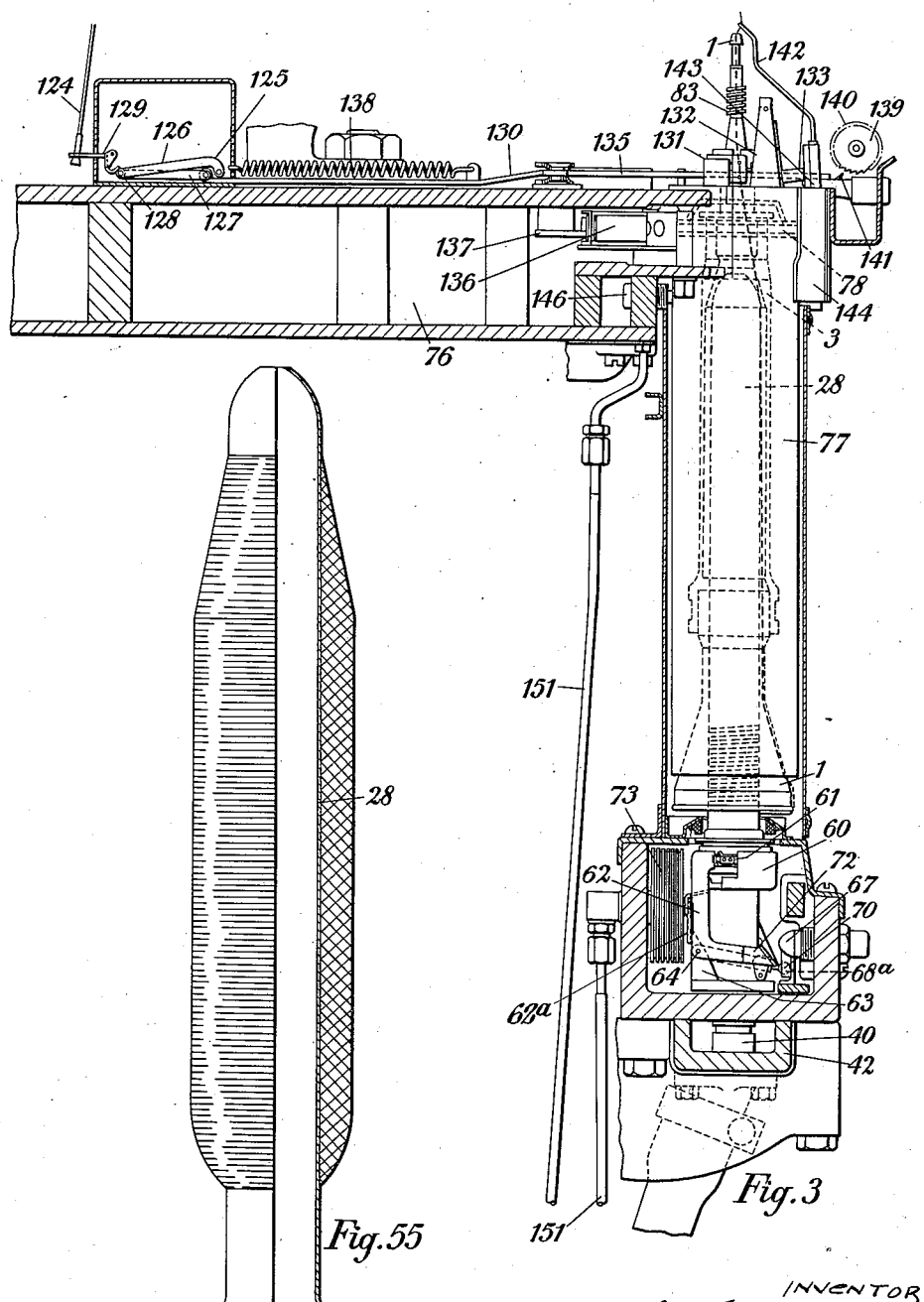

March 31, 1936. S. Z. DE FERRANTI 2,035,691
SPINNING, DOUBLING, AND TWISTING MACHINERY
Filed Dec. 31, 1934   9 Sheets-Sheet 4
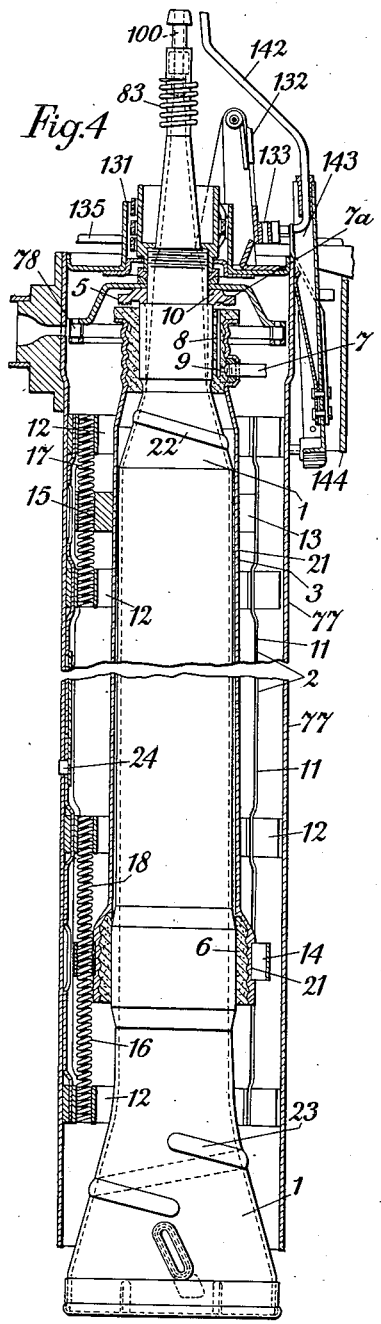
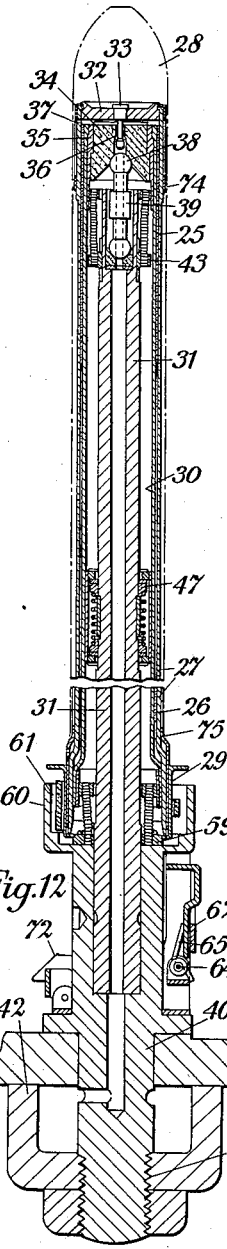
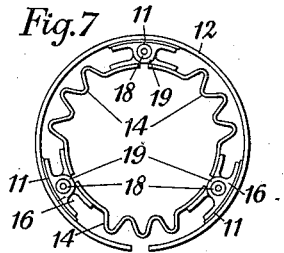
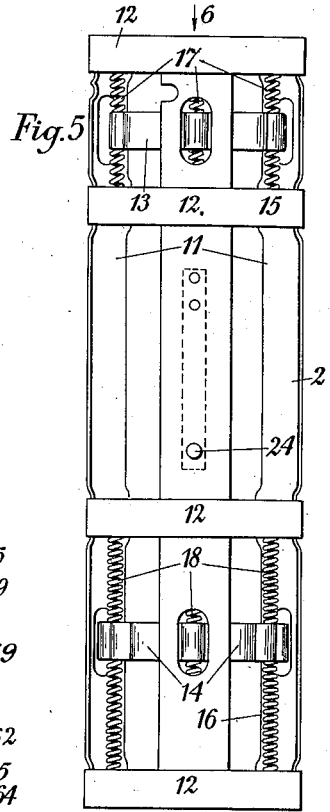
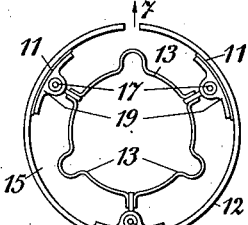

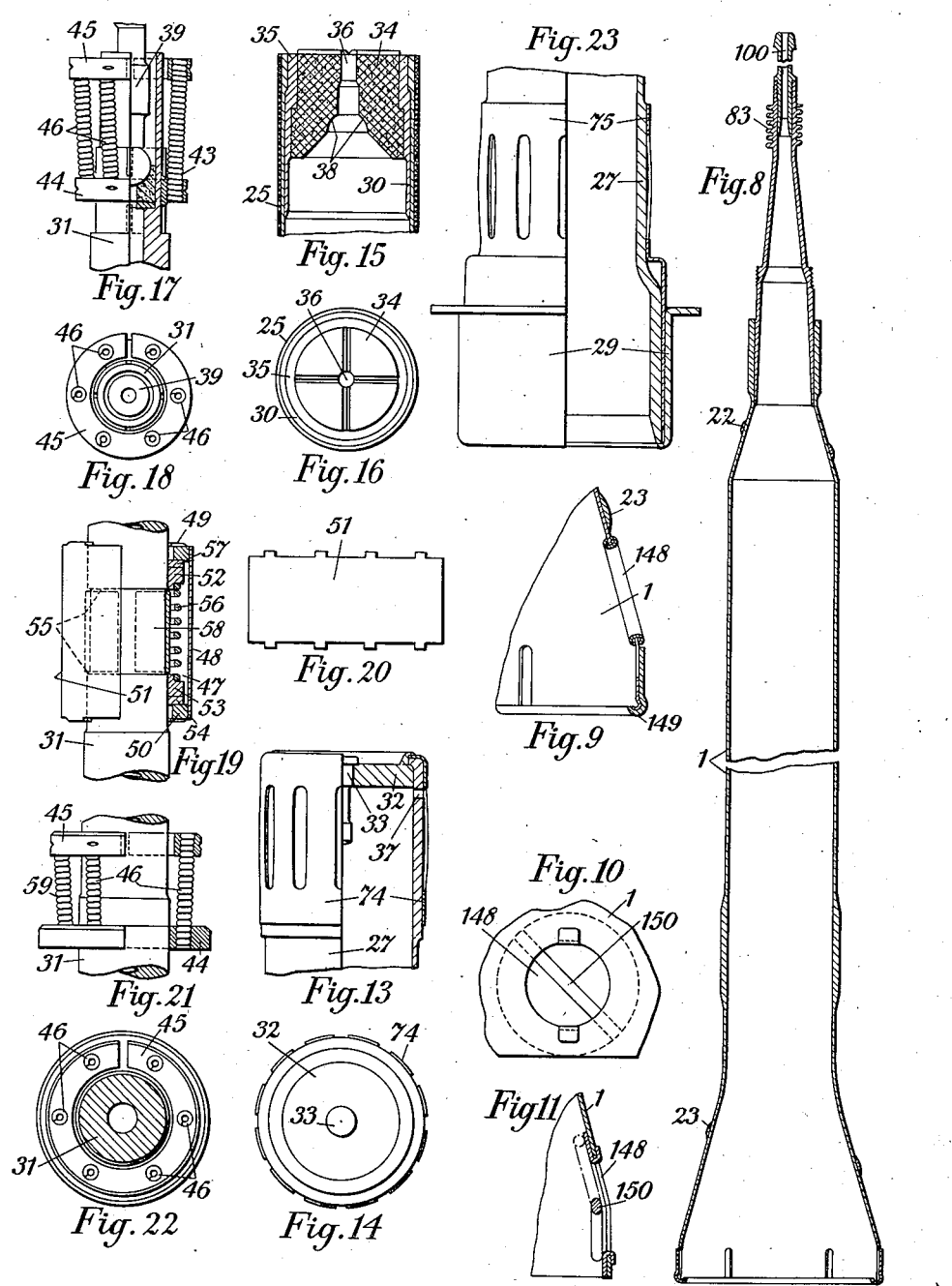

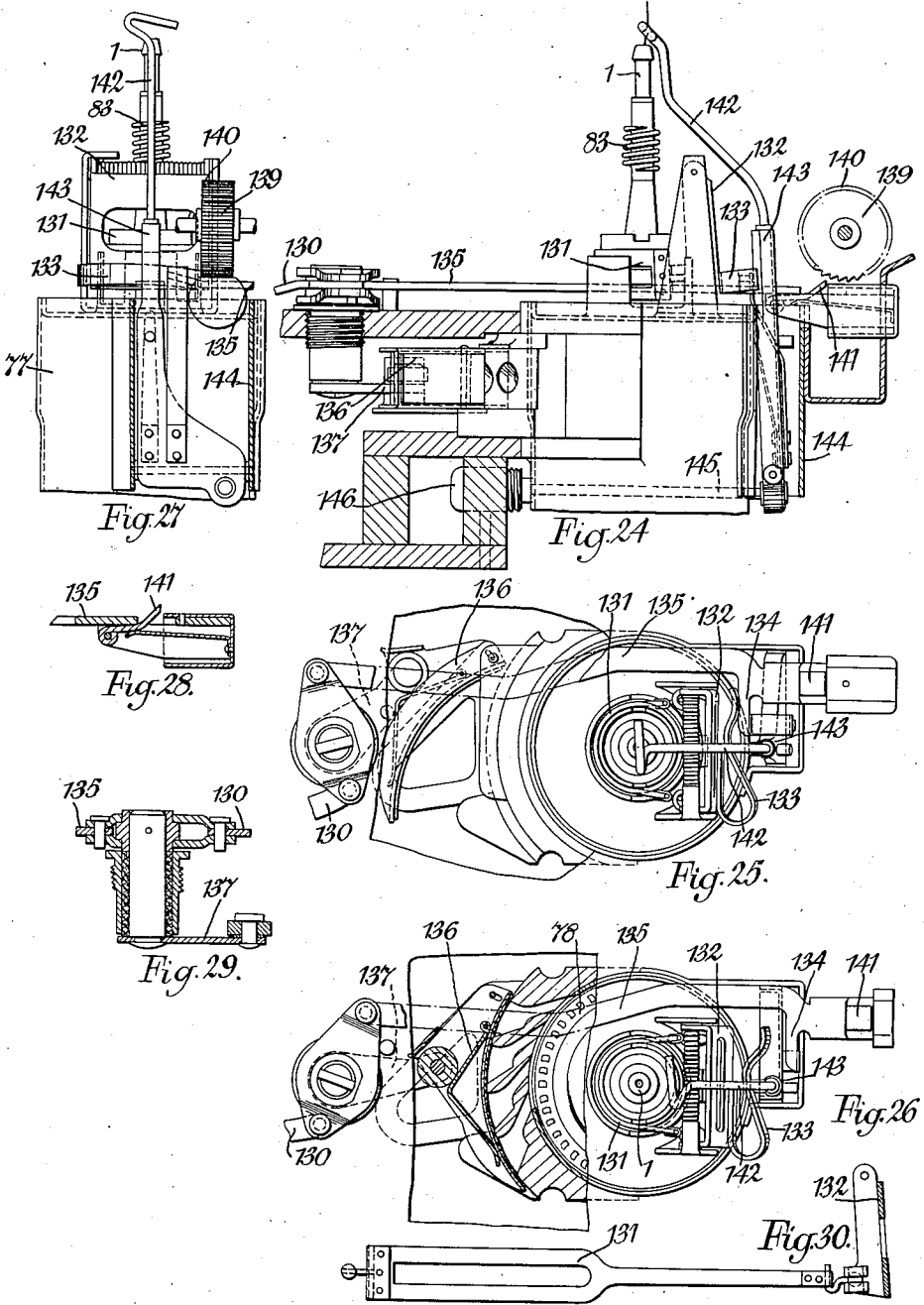

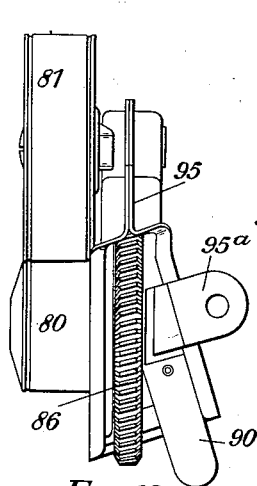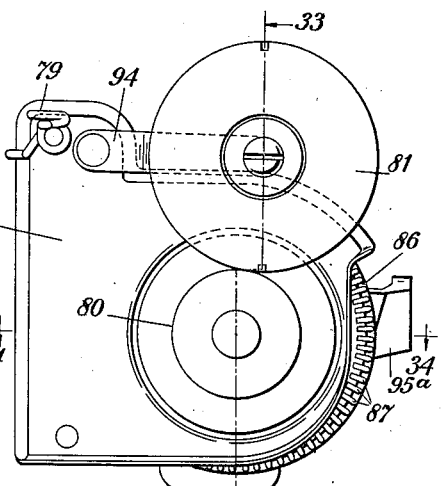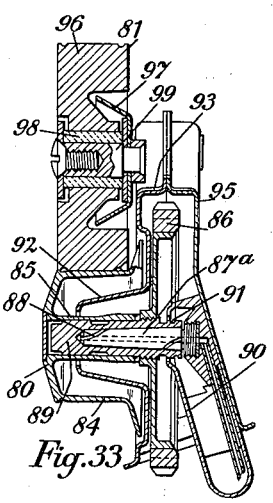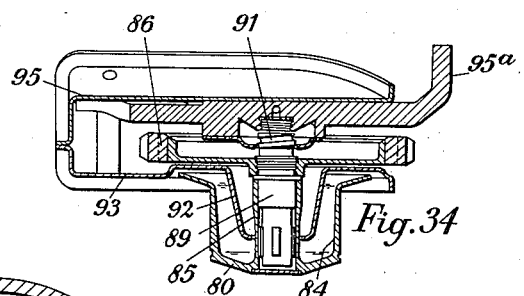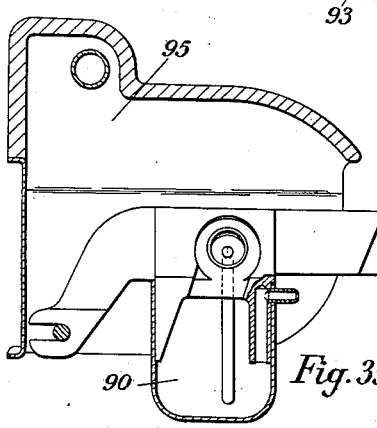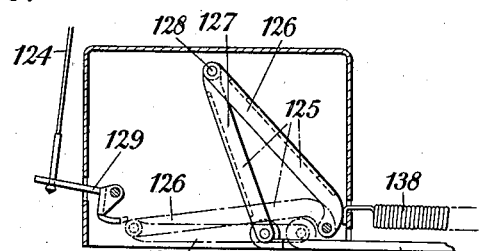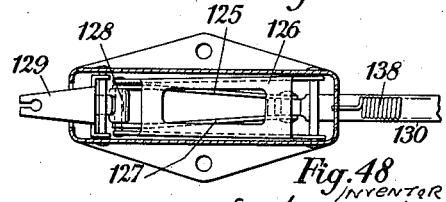

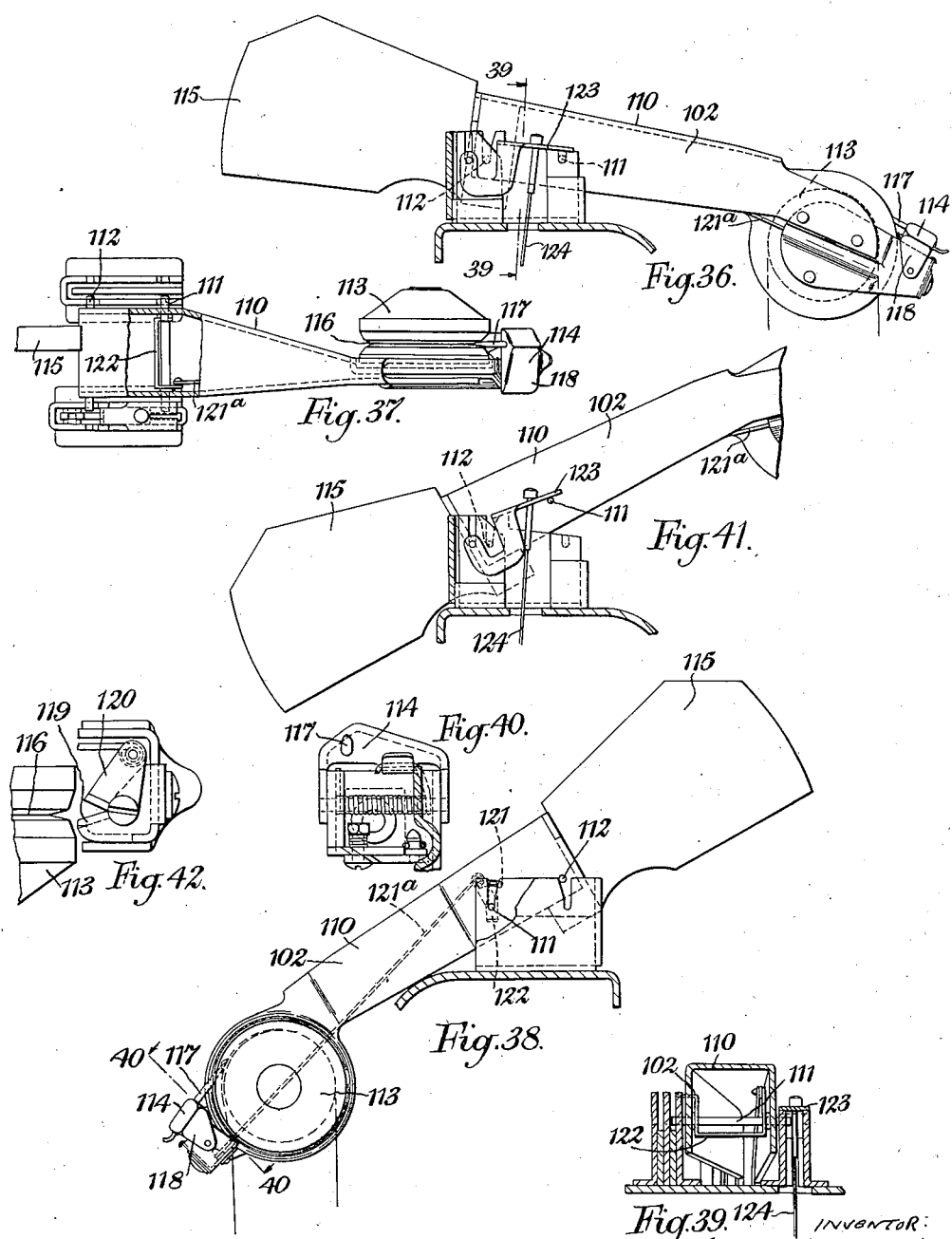

March 31, 1936.   S. Z. DE FERRANTI   2,035,691
SPINNING, DOUBLING, AND TWISTING MACHINERY
Filed Dec. 31, 1934   9 Sheets-Sheet 9
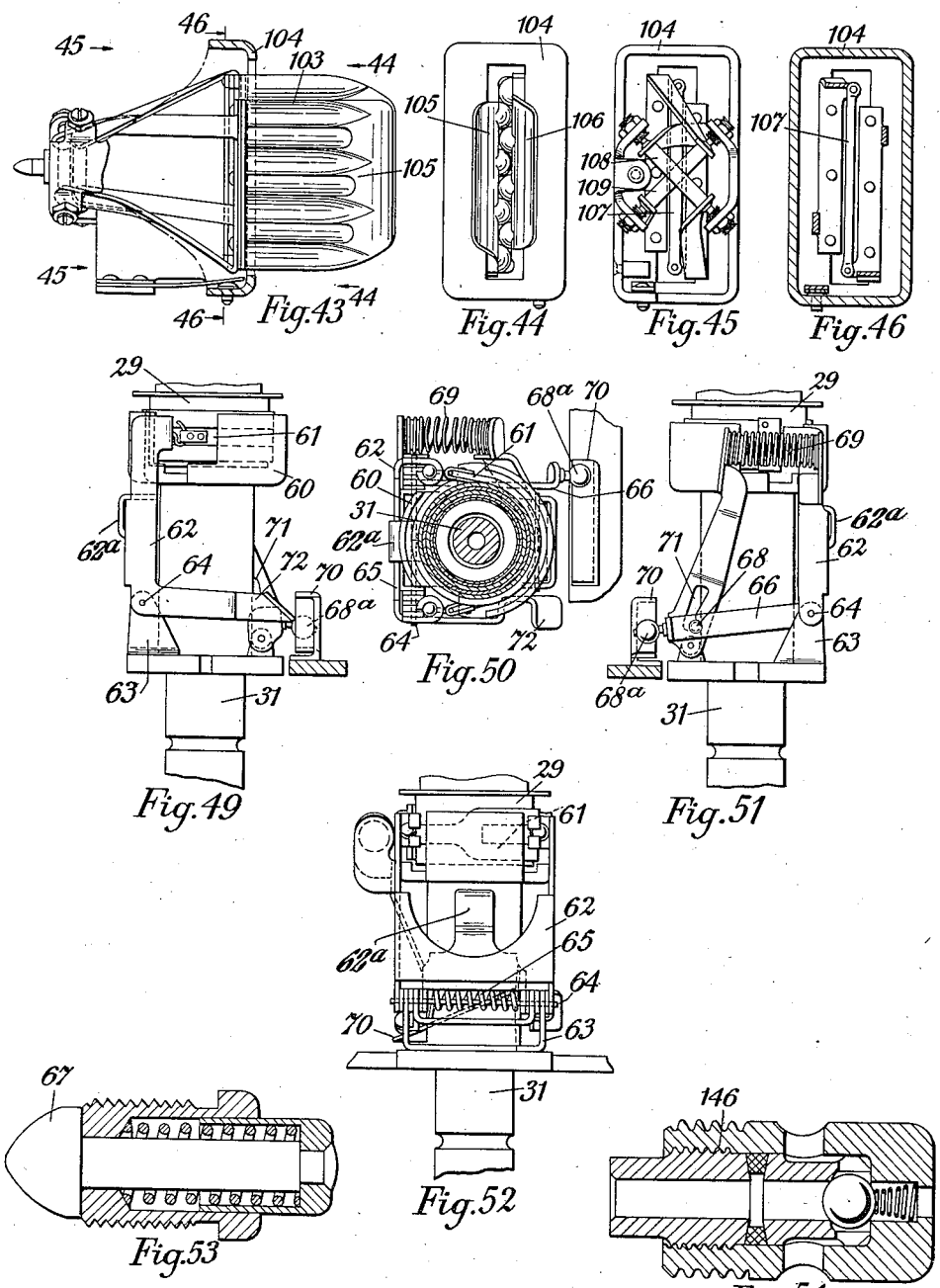

UNITED STATES PATENT OFFICE 2,035,691

SPINNING, DOUBLING, AND TWISTING MACHINERY

Sebastian Ziani de Ferranti, deceased, late of Hollinwood, England, by Gertrude Ruth Ziani de Ferranti, executrix, Upper Basildon, Pangbourne, England, assignor to Ferranti Inc., New York, N. Y.

Application December 31, 1934, Serial No. 760,003
In Great Britain February 13, 1933

8 Claims. (Cl. 118—51)

This invention which is a continuation in part of an application Serial No. 710,366 filed the 8th day of February, 1934, relates to spinning, doubling and twisting machinery, especially to machines of the high speed flyer type. Investigation of a comparatively large number of spindles of this type showed that much had still to be done to ensure the desired success both from the aspect of speeds and also from that of product, and especially from the aspect of obtaining the desired product at the desired speed.

Many Letters Patent were subsequently obtained by the late Dr. S. Z. de Ferranti dealing with improvements made from time to time, and the object of the present invention is to provide still further improvements.

The late Dr. Ferranti found that with the above objects in view, the flyer should be balanced to a very high degree of accuracy, special attention should be paid to spindle construction and bearings, and also to flyer constructions and feed of yarn. The present application deals among other matters with the balancing of flyers to a high degree of accuracy, and includes also the combination in high speed spinning and like machinery of such flyers with suitable spindle constructions and bearings and flyer constructions and feeds, for the provision of spinning and like machines, improved to a very high degree.

Dealing with the question of flyer balancing, the late Dr. Ferranti found that the flyers should be balanced to such a high degree of accuracy as had not previously been realized to enable even the high speeds which had already been proposed to be maintained with economy from the point of view of breakage of the yarn, and further, that special attention should be paid to the bearings for the flyers.

The present invention consists in apparatus for spinning, doubling and twisting comprising a spindle, a flyer, resilient bearings for the aforesaid spindle, resilient bearings for the aforesaid flyer, at least three balancing masses disposed on said flyer in individual planes containing the longitudinal axis of the flyer, the angle between any adjacent pair of said planes being less than 180° and the circle of rotation of every individual mass being non-coincident with the circle of rotation of any other of said masses, said flyer being balanced to such a degree whilst rotating, by appropriate removal of part of at least one of said masses that when the machine is in normal running operation the said bearing surfaces on the flyers will not maintain contact with their coacting bearing surfaces.

The present invention further consists in the use in a machine for spinning, doubling and twisting fibrous materials of resilient bearings and high speed air borne rotary parts for imparting the twist including the use of a flyer which is balanced to such a degree that the flyer does not actually contact with the bearing surfaces of its bearing tube whilst the machine is in normal operation.

The invention also consists in apparatus for spinning, doubling and twisting fibrous materials as described above including a flyer balanced to the degree specified and mounted in a form of resilient or spring-supported bearing comprising two parts namely an outer cage and an inner tube, air bearings for supporting the flyer in the inner tube and resilient means for supporting the inner tube in the cage.

The invention also consists in apparatus for spinning, doubling and twisting fibrous materials as described above including a flyer balanced to the degree specified and mounted in a form of resilient or spring-supported bearings comprising two parts namely an outer cage and an inner tube, air bearings for supporting the flyer in the inner tube and resilient means for supporting the inner tube in the cage, the said inner tube being furnished with two bearing surfaces.

The invention also consists in apparatus for spinning, doubling and twisting fibrous materials as described above including a flyer balanced to the degree specified and mounted in a form of resilient or spring-supported bearing comprising two parts namely an outer cage and an inner tube, air bearings for supporting the flyer in the inner tube and resilient means for supporting the inner tube in the cage, the said inner tube being formed from electrodeposited copper.

The invention also consists in apparatus for spinning, doubling, and twisting fibrous materials as described above including a flyer balanced to the degree specified and mounted in a form of resilient or spring-supported bearing comprising two parts namely an outer cage and an inner tube, air bearings supporting the flyer in the inner tube and resilient means supporting the inner tube in the cage, the said inner tube being formed from electrodeposited copper and furnished with two carbonaceous bearing surfaces.

The invention also consists in apparatus for spinning, doubling and twisting fibrous materials including a spindle assembly comprising an outer running tube for carrying a bobbin, a brake drum at the base of said outer running tube, an intermediate tube stationary but free to vibrate and having the same degrees of freedom as the running tube except that of rotation about its axis, circumferential bearing surfaces on said intermediate tube coacting with said running tube, a thrust bearing at the top of said intermediate tube for supporting said running tube, a fixed inner dead spindle, a braking assembly on said dead spindle coacting with said brake drum on said outer running tube, resilient supporting means and spring damping means on said dead spindle for supporting and damping respectively said intermediate tube.

The invention also consists in apparatus as described above wherein the damping device carried by the inner dead spindle is composed of three parts, viz. one near each end and one near the middle of the said spindle and between the spindle and said intermediate tube.

The invention also consists in apparatus as described above including means on the outer running tube for frictionally securing the bobbin to said running tube.

The invention also consists in apparatus for high speed spinning, doubling and twisting which includes a flyer formed by electrodeposition upon a mandrel.

The invention also consists in apparatus for high speed spinning, doubling and twisting which includes a flyer formed by electrodeposition of copper upon a mandrel.

The invention also consists in apparatus for spinning, doubling and twisting fibrous materials including a spindle assembly consisting of three parts or components, namely: an outer running tube for carrying the bobbin and having a brake drum at the base; an intermediate bearing tube stationary but free to vibrate, having the same degrees of freedom as the running tube, except that of rotation about its axis, and having bearing surfaces on which the running tube rotates and provided with a thrust device forming a thrust or carrying bearing for the running tube at the top, the intermediate tube being resiliently supported on a fixed inner dead spindle which is provided with a braking assembly and a spring damping device.

The invention also consists in apparatus for high speed spinning, doubling and twisting including a flyer driven by air at pressures from about 1 to 2 lbs. per square inch, a bobbin carrying running tube rotating relatively to a dead spindle, a brake drum on said running tube, a braking assembly on said dead spindle coacting with said brake drum and automatic means for cutting off the supply of air on breakage of the material being spun.

The invention also consists in spinning, doubling and twisting machinery, substantially as herein described.

The accompanying drawings are provided to aid in the understanding of the invention and may shortly be described as follows:—

Figure 2 is a part sectional elevation of the yarn delivering and tensioning part in Figure 1.

Figure 3 is a part sectional elevation of the spinning mechanism of Figure 1.

Figure 4 is a vertical section through the axis of a flyer bearing and driving mechanism with the flyer itself shown in position but not in section.

Figure 5 is a side elevation of the resilient mounting for the flyer bearing.

Figure 6 is a plan view of Figure 5 looking in the direction of the arrow 6.

Figure 7 is an underside plan view of Figure 5 looking along arrow 7.

Figure 8 is a sectional elevation of a flyer.

Figure 9 is a sectional view of the flyer eyelet.

Figure 10 is a view of a modified flyer eyelet.

Figure 11 is a sectional view of the modification shown in Figure 10.

Figure 12 is a section through the axis of the spindle and its associated mechanism with a bobbin tube shown in chain dotted lines.

Figure 13 is a detail of the top of the spindle running tube shown partly in section.

Figure 14 is a plan view of Figure 13.

Figure 15 is a detail view of the top of spindle bearing tube unit in section showing valve for running tube bearing.

Figure 16 is a plan of the part shown in Figure 15.

Figure 17 is a detail view of the anti-vibration device for the top of the spindle carbon bearing tube.

Figure 18 is a plan of the part shown in Figure 17.

Figure 19 is a detail view of a damping device for the centre of the spindle carbon bearing tube.

Figure 20 is a developed view of the casing of the damping device shown in Figure 19.

Figure 21 is a detail of the anti-vibration device for the bottom of the spindle carbon bearing tube.

Figure 22 is a plan of the part shown in Figure 21.

Figure 23 is an elevation in part section of the bottom of the spindle running tube.

Figure 24 is a side elevation in part section of the flyer brake and control lever mechanism.

Figure 25 is a plan view of the parts shown in Figure 24 when in working position.

Figure 26 is a similar view to that of Figure 25 but with the parts in stopped position.

Figure 27 is a front elevation of a flyer brake and control lever.

Figure 28 is a sectional view of the starting button.

Figure 29 is a sectional view through the turbine valve actuating spindle and lever.

Figure 30 is a developed view of the flyer brake band.

Figure 31 is a side elevational view of a pair of feed rollers.

Figure 32 is a front elevation of the same parts as Figure 31.

Figure 33 is a sectional view through the feed rollers on line 33—33 of Figure 31.

Figure 34 is a section of lower feed roller and worm wheel on line 34—34 of Figure 31.

Figure 35 is a section of the oil feed box for the lower roller bearing.

Figure 36 is a side elevation of a balance lever in running position.

Figure 37 is a plan view of Figure 36.

Figure 38 is a reversed side elevation of balance lever in position caused by an obstruction in the yarn and showing cutter operating mechanism in dotted lines.

Figure 39 is a section on the line 39—39 of Figure 36.

Figure 40 is a section on the line 40—40 of Figure 38 to a larger scale.

Figure 41 is a side elevation of a balance lever in position taken up when yarn breaks.

Figure 42 is an underside view of the cutters shown to a larger scale than in Figure 38.

Figure 43 is a side elevation of a tensioning device.

Figure 44 is a front elevation of Figure 43 viewed in the direction of arrows 44—44.

Figure 45 is a rear elevation of Figure 43 in the direction of arrows 45—45.

Figure 46 is a section on line 46—46 of Figure 43.

Figure 47 is a detail of the toggle tripping mechanism with box in section, the toggle being shown in full lines in the collapsed position and in chain dotted lines in normal position for spinning.

Figure 48 is a plan view of Figure 47 partly in section.

Figure 49 is a side elevation of a spindle brake mechanism.

Figure 50 is a plan of Figure 49 partly in section.

Figure 51 is a reverse elevational view of Figure 49.

Figure 52 is a rear elevational view of Figure 49.

Figure 53 is a sectional view of a button for releasing the spindle brake.

Figure 54 is a section of a control valve controlling the hold-off mechanism for the flyer brake.

Figure 55 is a part sectional elevation of a bobbin tube with yarn wound on it.

Figure 1:
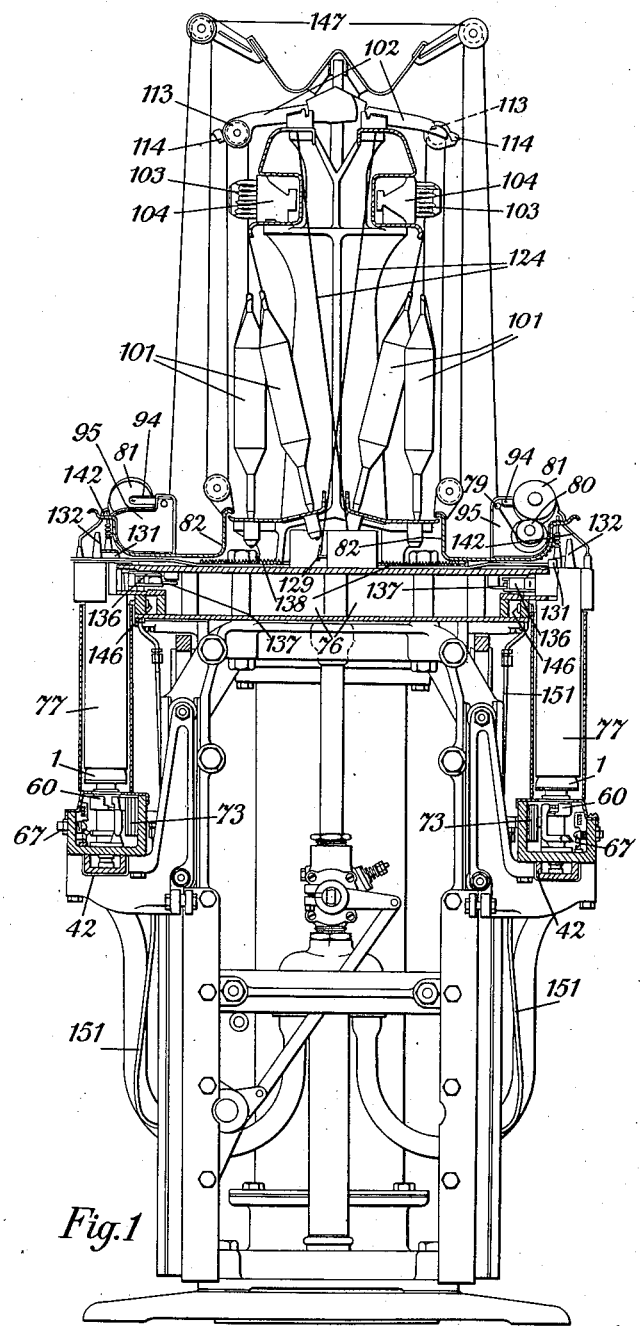
Figure 1 is a diagrammatic elevation of a spinning machine according to the invention.

In carrying the invention into effect in one form by way of example applied to Ziani de Ferranti type machines, for instance, those operated on the principles of British Letters Patent Nos. 18,047/03, 18,260/04 or 24,941/06, the flyer is balanced to a high degree of accuracy. To effect this according to one form, the flyer is made by electro-deposition of copper, and is preferably chromium-plated. The bearing surfaces of the flyer should be ground.

Balancing according to one form is effected by the method described in the specification of British Patent No. 399,845, the balancing process being carried out by removing parts of the spirals 22 and 23 with all the rotating parts of the flyer assembly in place. Referring to Figure 4, the bearings for the flyer 1 consist of a form of resilient or spring-supported bearing comprising two parts, namely, an outer cage 2 and an inner tube 3. The flyer in its cage 2 is contained in the casing 77 of the machine shown in Figures 1 and 4. The flyer 1 is air-borne along the axis of the inner tube 3 and within it, and this inner tube is spring-supported inside the cage 2. The inner tube consists of an electrodeposited copper shroud containing two carbon bearing surfaces 5 and 6 coacting with corresponding bearing surfaces on the flyer. The homogeneous structure obtained by electrodeposition enables balancing to be more readily effected, and the carbonaceous bearing surfaces enable the desired high speeds to be obtained with safety. Near the top of this tube air from any convenient source enters an inlet 7 which communicates with a channel formed by two drillings 8 and 9 at right angles, for leading air to a space 7a beneath an air thrust washer 10 for keeping the rotating flyer assembly 1 from contact with the top of the flyer bearing tube 3 against the action of gravity. The bearing surfaces 5 and 6 within the tube are short in length and widely separated. The bearings are of moderate area, but need not be self-aligning; being divided they can distort through a comparatively great angle without upsetting conditions for the high speeds which come into question, especially where large bearing areas are to be avoided. To ensure against seizure in the event of temporary breakdown of the air film in the bearings 5 and 6 one or both of the elements of each bearing is or are constructed of non-seizing material.

Satisfactory materials which do not seize are, for the rotor, chromium, chromium plated copper, polished copper, polished iron, or other suitable polished hard metal; for the stator, a mixture of synthetic resin and graphite or colloidal carbon, free from grease, is suitable.

The outer cage 2 in which the flyer bearing tube 3 is suspended consists of longitudinal strips of steel 11 with circumferential rings 12 welded to the strips.

The flyer bearing tube 3 is held stationary by two corrugated rings 13 and 14 in which it is a push fit. These corrugated rings 13 and 14 are separated by springs in line. There are two spring assemblies, 15 and 16, one at each end of the cage 2, and each consisting of three helical springs marked 17 and three marked 18, the mid points of the springs being attached to the flyer bearing tube supporting rings 13 and their ends to the rings 12 by means of the brackets 19. The bearing and bearing cage referred to above provide a self-centering bearing for and support the flyer; the corrugated rings 13 of the cage being adapted to engage grooves 21 on the outside of the flyer bearing tube 3.

The position of the cage is located by a spring pressed pin 24 which enters a hole in the surrounding casing.

The spindle constructions and bearings and flyer constructions and feed of yarn are preferably such as are hereinafter described.

When applied by way of example to Ziani de Ferranti type machines, for instance, those operating on the principles of British Letters Patent Nos. 18,047/1903, 18,260/1904 or 24,941/1906, special bearings 25 and 26 for the outer running tube of the spindle assembly made of carbon or the like are used to prevent seizing and may be in two axially separate parts as shown in Figure 12 or may be a single long bearing.

The spindle assembly in one example shown in Figure 12 consists of three parts or components, namely: an outer running tube 27 for carrying the bobbin 28, and having a brake drum 29 at the base; an intermediate bearing tube 30, stationary but free to vibrate, having the same degrees of freedom as the running tube 27, except that of rotation about its axis, and having bearing surfaces 25 and 26 on which the running tube 27 rotates. It is also provided with a thrust device, described below, forming a thrust, or carrying bearing for the running tube at the top. This intermediate tube 30 is spring-supported on a fixed inner dead spindle 31, which incidentally is also provided with a braking assembly and a spring damping device as described below.

The outer running tube 27 is formed of electro-deposited copper, a brass braking drum 29 being secured to the base. The top of the tube 27 is closed by a cap 32 carrying a small valve spindle 33, the bottom part of which enters a valve seating in the top of the intermediate tube.

The valve consists in a steel pin, the lower part of which is of greater diameter than the remainder.

The intermediate tube is formed of electrodeposited copper, and carries the bearing surfaces of carbon for the outer tube.

The intermediate tube 30 is closed at the top by a grooved graphite plug 34, held in place by a steel ring 35. It is bored centrally with a small hole 36 forming the seating for the valve pin 33 at the top of the outer running tube. The function of this valve is to enable air to pass by lifting the outer running tube to a certain extent, this lifting acting to reduce the air supply to such a degree as to balance the leakage of air permitted by a small hole 37 in the outer running tube near the top. Air enters through the hole in a brass swivelling air connecting piece 39 from the bottom of the spindle and passes out at the top of this connecting piece through the hole 36, passing round the valve pin 33 and then lifts the running tube by pressure on the cap 32, until a height is reached at which the hole 37 in the outer running tube becomes exposed and so permits the air to escape. Consequently, the pressure on the running tube decreases and a state of equilibrium is reached when the quantity of air admitted and pressing upwards equals the quantity of air escaping. The lower face of the top carbon closing plate 34 is formed with a hemispherical seating 38 to take the connecting piece 39, which is mounted in the top of the inner spindle 31..

The inner spindle 31 consists of a steel tube closed at the base by a plug 40 externally threaded at 41 for mounting the tube in the rail 42. Alternatively, the spindle may be turned from the solid and internally drilled.

At the top of the spindle a resilient cage 43 (see Figure 17) for supporting the intermediate tube is mounted. The resilient cage consists of a lower brass ring 44 fixed to the spindle and an upper ring 45 with a substantial clearance about the spindle, the two rings being joined by a series of helical springs 46. Within the tube, in the vicinity of this cage, there is provided a brass tubular connecting piece 39 with spherical ends, one bearing in the spindle and the other bearing the intermediate tube. Air passes through this connecting piece from the inside of the spindle to the inside of the intermediate tube. The dead spindle also carries a spring rod friction damper 47 for connecting with approximately the mid-point of the intermediate tube. The position, however, does not appear to be material.

This damping device, see Figures 19 and 20, consists of an outer cage 48 comprising top and bottom washers 49 and 50 respectively, having a substantial clearance with respect to the spindle 31, and loosely carrying a cylindrical spring clip or incomplete ring 51. Two further brass washers 52 and 53 are associated with the spindle, and are locked roughly in position between two shoulders 55 formed on the spindle by the edges of a split collar 58; fibre or other damping washers 54 and 57 rest on the spindle between the brass washer 50 and the lower washer 53 and the brass washer 49 and the upper washer 52 respectively. The two brass washers 52 and 53 are loose on the spindle but have very little clearance.

Between these two washers a light helical spring 56 is disposed. The clearances of these washers are less than the clearances of the washers of the outer assembly.

The resilient washers 54 and 57 act as friction washers, and are provided for that purpose.

The assembly apparently acts to prevent excessive amplitude of vibration which might be caused by out-of-balance due to differences in winding of the cotton on the bobbin resulting from, for example, periodical uneven drag.

At the bottom of this fixed spindle a spring mounting 59 similar to that at the top is provided, but it is of larger diameter. It is contained within a cage 60 (Figures 49 to 52) fixed to the spindle over the brake drum 29, and in the space between the two the brake band 61 is placed. What is hereinafter termed the main brake control is the control of the brake band in such a manner as to stop the rotating bobbin tube or permit this tube to run freely whilst the subsidiary brake control is the control of the brake band in such a manner as to have a variable braking effect upon the bobbin tube whilst the latter is being filled with the object of maintaining the tension in the yarn between the flyer and the bobbin within predetermined limits. This brake band, which is similar to the one shown in Figure 30, is carried by a clip 62 pivoted on a support 63, the pivot pin 64 which holds the clip having a helical spring 65 mounted on it, which normally keeps the brake band 61 in contact with the brake drum 29. A thumb pressed piece 67 (see Figure 53) is provided for relieving the brake carrier or clip 62 from the action of the spring 65, the tendency of which is to apply the brake by pulling the end of the brake band and so tightening the brake. The lever 62 carrying the brake band is relieved from the effect of the spring 65 by an aneroid device 73 pressing a member 62a hinged on the pin 64 and transmitting the tension of the spring 65 to the lever 62 so as to release the brake when air enters the aneroid device and vice versa.

In normal running operation the aneroid is full of air supplied from any convenient source by way of a pipe controlled by a valve attached to the wire 142 shown at the top right-hand of Figure 4. The lower end of this wire is pivoted so that the position of the wire depends on the tension in the yarn entering the top of the flyer.

When the air is shut off from the machine for any reason, the valve is released, and air is thus prevented from entering the aneroid, so applying the brake. The brake is also applied, through the medium of the same wire 142 and valve, when the yarn breaks or the supply of yarn from the cop becomes exhausted.

The retardation of the bobbin must be constant, regardless of the amount of yarn already on the bobbin, otherwise there will be either too much or too little tension in the yarn between the flyer and the bobbin which will cause either breaking or snarling of the yarn respectively.

This effect is achieved by means of a lever 66 and the ramp or inclined plane 70 which raises it continuously throughout the filling of the bobbin.

The aforesaid lever 66 is pivoted on the pin 64, is urged downwardly by the spring 65, and has a pin 68 which serves to operate a subsidiary brake control. The subsidiary control is connected with the brake band lever 62 by means of a very light helical spring 69. The lever 66 referred to above is automatically moved up throughout the filling of the bobbin by the ramp 70 raising the ball end 68a of the arm or lever 66 (see Figures 49 to 52). The ramp is so arranged that it follows the vertical movements of the spindle and in addition has a horizontal movement relative to the spindle rail so that it raises the ball end 68a of the lever 66 once for each complete filling of the bobbin. The slot 71 in which the pin of this lever works is so shaped that as the lever moves up, the compression effect of the light helical spring 69 first increases and then decreases. Thus during the filling of the bobbin the retarding effect of the brake is at first increased until the full diameter is attained and is then gradually decreased during the remainder of the filling. The effect of this adjustment is that the tension of the yarn is maintained within the necessary limits to preclude snarling or breaking in spite of the differences in the diameter at which winding takes place, windage resistance and other factors. Any decrease of tension below a certain minimum amount would cause snarling of the thread. The brake is provided with a thumb button release in which an inclined part of a bell crank continuation 72 of the U shaped brake band fixing 62 is adapted to be depressed by the curved end of the push button 67.

The brake band U-shaped carrier clip is relieved of the tension of the main spring 65 by means of an aneroid device 73 (Figure 3) consisting of a number of brass cells. The braking action of the main spring 65 is removed immediately upon the admission of air into this device and remains off throughout the filling. When the air supply is cut off on the stopping of the frame the aneroid device collapses and the heavy braking action of the spring 65 comes into effect. Similar conditions occur on the stoppage of any individual unit for any cause.

The spindle assembly carries the bobbin 28 which consists of an electrodeposited copper tube, the means for driving the bobbin comprising two slotted steel rings 74 and 75 mounted respectively at top and bottom of the driving tube 27, the bobbin being a push-fit on these rings.

When applied by way of example to Ziani de Ferranti type machines, for instance, those operating on the principles of British Letters Patent Nos. 18,047/03, 18,260/04 or 24,941/06, the method employed for the manufacture of the high speed flyers consists in electro-deposition upon suitably shaped mandrels. The preferred metal is copper, but alternatively, iron may be used. Other metals or alloys may also be chosen.

As an example of the manufacture of a flyer a suitable mandrel of highly polished steel and slightly tapered is arranged so that it can be rotated in a bath containing copper-sulphate solution. The copper is deposited electrolytically in known manner. After a suitable thickness has been deposited, a coating of rubber or other convenient insulator is placed on the embryo flyer, except at those parts which are to form bearing surfaces. Electrolysis is then continued so that these surfaces are built up to a greater thickness. The mandrel and copper sheath are removed from the electrolyte and placed in hot water so that the sheath, having a larger coefficient of expansion than the mandrel, can be easily removed, the taper of the mandrel assisting in the process.

The flyer is now machined by mounting on a duplicate mandrel and grinding the bearing surfaces. It is then chromium-plated, after which the top portion of the flyer carrying the worm is soldered into position.

The flyer drive to a certain extent follows British Specifications Nos. 18,260/04 and 16,716/05.

The air pressure used is from 1 to 2 lbs. per square inch. The speed is of the order of 20,000 revolutions per minute.

There is an automatic cut-off of the supply of air on breakage of the yarn. Referring to Figure 1 the air flow is from the air chest 76 by way of a direct connection to the flyer casing 77, thence to the turbine 78, and afterwards, by exhaust to atmosphere. There is a flexible connection 151 between an aneroid device 73 for releasing the spindle brake and the flyer drive air on the turbine side of the flyer shut-off valve; the result of this is that should an individual flyer be stopped, the spindle is automatically stopped by allowing the spring 65 to act on the brake, and permitting full braking to take place. This takes place in the following manner:—

If the flyer stops it ceases to lead the spindle, consequently the tension in the yarn is reduced sufficiently to enable the control wire 142 to move towards the centre of the frame. This shuts off the air by means of a ball valve 146 (Figures 24 and 54) from the aneroid device 73 and so causes the running tube to slow down.

As regards the feed of yarn to the flyer, the feed takes place through an eye 79 (Figure 2), under a lower roll 80, between the lower and an upper roll 81, over the upper roll, over the hooked end of the control wire 142 described later and down through the top of the flyer 1. The lower roll 80 is partly immersed in a trough of water 82 for wet spinning. These details are clearly shown in Figure 2.

The yarn after entering the flyer passes down the inside and either passes out through the orifice 148 and round the skirt 149 of the flyer to the bobbin as in Figure 9 or out through the upper part of the hole 148 over the wire 150 and back through the lower part of the hole 148 as in Figures 10 and 11.

The two rolls 80 and 81 are set at an angle to the vertical, this angle being so chosen that thread entering the eye 79 and the thread leaving the rolls are in one plane, which plane also contains the axis of the flyer worm 83. To effect this conveniently the rolls 80 and 81 are carried, together with the eye 79 and the worm wheel which engages with the worm on the flyer, in a frame 95 which is supported in the spinning machine by means of the lug 95a at such an angle that the oil trough 90 is substantially vertical. The lower roll 80 consists of a hollow shell 84 (Figures 34 and 35) with an internal tubular hub 85 which engages with a connecting piece 89 which latter screws into the worm wheel 86 driven by the corresponding flyer worm. The worm wheel is formed with teeth 87 of a self-lubricating material, such as lignum vitae, set at an angle to the axis to allow for the departure of the axis of the roll 80 and the worm wheel 86 from the horizontal.

This assembly of lower roll 80 and worm wheel 86 is carried on an axially drilled conical pin 87a having a groove 88, the pin forming an axle for the part 89 which latter is recessed to form an annulus 91 in communication with a supply of oil in a trough 90 from which the oil enters the annulus by capillary action. As the lower roll rotates, the oil is drawn along the groove 88 and exhausts back to the trough through the clearance between the spindle and the tube of the lower roll. This ensures continual automatic lubrication. The assembly of lower roll and gear wheel is, in fact, supported, in the sense that the roll is provided with a conical shield 92 for preventing water interfering with the lubrication. This cone forms part of a plate 93 in an angular two-part casting 95 disposed at an angle to the vertical for the reasons explained above.

The upper roll 81 is mounted on the end of an arm 94 loosely pivoted in the same casing. It consists of an outer casing 96 with an inner shell 97, the former carrying a carbon bush 98 and the latter a steel pin 99 forming the bearing. The weight of the top roll is more than sufficient to overcome the tendency of the yarn to slide between the rolls due to its drag, but is not sufficiently great to cause damage to the yarn owing to this drag, or to flatten the yarn.

The described angular setting of the feed rolls and worm gear enables the yarn to be directly in line with the mouth 100 of the flyer, giving the minimum amount of gearing between the flyer and the feed roll, whilst maintaining the correct and individual twist.

The gear acts as a kind of balance between, or synchronizer of, the feed roll drive and the flyer drive.

The feed rolls are driven both by the yarn, due to the pull on the bobbin, and by the flyer, due to the gearing at the top.

There are also provided a special thread severing arrangement automatically operative on snarling of the yarn and a stopping device automatically operative on breakage of the thread.

The snarling referred to here is not a matter of snarling below the feed rolls 80 and 81. The term "snarling" includes, however, any holding up of the yarn between the cop 101 and the balance arm 102 referred to below. In the first place the balance arm is raised to such a height above the feed rolls, or the length of thread between the severing device of the balance arm and the feed rolls is made so great by the interposition of spaced pulleys as shown in Figure 2 that should a thread be severed a single length will not fall from the top into the rotating parts, and so cause an entanglement before the flyer has been brought to rest.

For doubling, the cops are arranged in pairs, doubling being effected from the cops directly. The thread from each cop is passed through a tension device 103. This consists of a framework of metal plate 104 (Figures 43–46) carrying two co-operative plates of gridiron character 105 and 106 with rounded beads, the bead of one entering the slot of the other. These two plates are connected by a light cross arm 107, diagonally arranged to form a kind of link motion, the cross arm being slightly offset from the plates. The plates have a cross mounting, that is to say, the top of the left plate is pivoted on the right hand side of the framing at the top, and the bottom of the left plate is pivoted on the left hand side of the casing at the bottom. The top of the right plate is pivoted on the left side of the casing at the top, and the bottom of the right plate is mounted on the right of the casing at the bottom. The mountings are made on cross centres 108, 109 disposed at 45° to the vertical, so that in this way the plates tend to fall by their own mass, the result being that the frictional control is independent of any spring variation, or of the speed of the yarn passing through the tension device or of other characteristics of the yarn.

From this tensioning device the yarn passes to the balance arm 102 referred to above (Figures 36 and 37). This balance arm consists of an aluminium or like framework 110, having two points of suspension 111 and 112. It is provided at one end with a roller 113 fitted with the clearer assembly 114 described below, and a counterbalance 115 at the other, so that of itself it normally tends to sit with the roll 113 elevated. When the frame is running the balance arm 102 rests on both pivots, being kept in this position owing to the friction on the yarn introduced by the tensioning device 103. This friction is insufficient to cause the balance arm to pivot only on the pivot 111 nearer the roll. Should the pull on the yarn become too great, owing to some defect in the yarn acting on the clearer on the roll 113 referred to below, or owing to a hold-up on the cop 101, the balance arm 102 pivots on the forward pivot 111 only.

The clearer assembly 114 consists of a grooved pulley 115 having a U shaped groove 116 with which a pin 117 co-operates. The pin is made of such a size, and the grooves of such a depth, that it will not pass faulty yarn, which latter would become impaled on the spike and cause the balance arm 102 to tip on to the forward pivot 111.

The pin referred to above is mounted in a spring controlled frame 118. The balance arm is provided with a thread severing device 119 disposed in the vicinity of the grooved pulley and consisting of a scissors device, the movable part 120 of which is operated by a wire 121a connected with a light pivoted frame 122, one end of which projects through a slot 121 in the framework 110, in the vicinity of the forward pivot 111. The shape of this slot and the position of the projecting part is such that when the arm 102 pivots about the rear pivot 112, the projection from the scissors operating frame 122 is quite clear of the side of the slot 121 in which the scissors projection rides, but when the arm 102 is caused to pivot about the forward pivot 111, the side of the slot 121 catches the projection, causing it to ride backwards in its own slot 121 and sever the yarn.

On the yarn breaking or being severed, the arm 102 becomes free, and assumes the position corresponding to the position of equilibrium, which may be vertical or substantially so as controlled by the general framework of the machine. The result of this is that the forward pivot 111 lifts a small plate 123, which raises a wire 124 extending downwards to a trip gear which controls the air valve on the flyer. As shown in Figure 47 the trip gear includes a toggle 125 with two arms 126 and 127 of unequal length, the apex 128 of the toggle being normally held in position by a roller on the toggle apex and light tongue or bell crank lever 129 pivoted in the framework. The light pull on the tongue 129 breaks the toggle and an arm 130 connected thereto on this occurring moves forward and cuts off the air supply.

This operation is performed in the following manner:—

The arm 130 is connected to the toggle arm 127 by means of a pivot (see Figure 47) so that when the hinge 128 of the toggle is below the light tongue or bell crank lever 129, the rod 130 is extended towards the outside of the frame. This holds the flap of the air valve 136 in the working position by means of the lever 137 (see Figure 26). On release of the toggle by removal of the light tongue 139, the spring 138 pulls the arm 130 towards the centre of the frame, the toggle hinge moving upwards. This causes the lever 137 to move from the position shown in Figure 25 to that shown in Figure 26 and also causes the flap of the air valve 136 to shut off the air supply to the turbine nozzle and aneroid.

The result of this is that on the severing or breakage of one of the threads of the pair of cops feeding the spindle the unit is stopped due to the air supply being cut off from the flyer and the brake applied to the spindle. A brake is also applied to the flyer.

The flyer brake 131 shown in Figures 24–27 and 30 consists of a brake band shown developed in Figure 30 operating on the flyer 1, the ends of the brake band being connected to a spring-controlled framework 132, substantially similar to that of the spindle brake. This framework is also provided with a flat spring 133 which co-operates with a spring pressed finger 134 controlled by the starting lever 135. When the starting lever is pushed forward, the flat spring is pushed forward, the brake is removed, the air supply is admitted to the turbine by the opening of the valve 136 by the lever 137, and the trip gear is re-set by stressing the spring 138 and until the apex of the toggle drops below the tongue 129. On the trip gear operating, for instance when a breakage of the yarn occurs, the wire 124 lifts and releases the toggle 125 and the spring 138 causes the starting rod 135 to be released. This trip gear is mounted on the casing 77 surrounding the flyer 1.

The trip action from the stopping action is provided with a delay device 139, which ensures that the spindle shall stop rotating before the flyer. This delay device consists of a grooved roll 140 in which the grooves are somewhat of ratchet formation, this roll co-operating with the top edge of a spring tongue 141 in the starting rod. This grooved roll continually rotates at a slow speed, so that the starting lever can only be moved back into the stopping position at a comparatively slow rate.

In connection with this mechanism generally a valve for operating the spindle stopping brake may be employed. A wire 142, mounted on the end of a light lever 143 pivoted in a casing 144 near the top of the flyer, and having at the lower end a push rod 145 operates a ball valve 146 shown in detail in Figure 54 which admits air to the spindle bellows or aneroid 73. When the brake is applied the flyer stops, and so the drag on the yarn is reduced. The wire 142, which is behind the yarn and pulled back by the tension of the yarn, is now allowed to come forward, thus closing the ball valve 146 and cutting off the supply of air to the spindle bellows. This allows the spindle brake to stop the spindle as previously described.

In all the above description it has been assumed that the spindle is a lagging spindle, that is to say, the flyer is driven and the rotation of the spindle is obtained by the pull of the yarn.

Another detail which may be noted is that the yarn in passing from the top balance arms 102 is doubled on overhead rolls 147, that is to say, the yarn from each pair of cops 101 passes over a single roll 147. From this overhead roll it is led to the feed rolls. The braking action on the whole of the spindles is simultaneously varied, as building up takes place by means of cam mechanism operating on a rod extending along the length of the frame and provided at each spindle with an inclined plane or ramp 70 on which rides the ball 68a mounted on the pivoted arm 66 carrying the pin 68 riding in the slot 71 of the auxiliary brake control.

The worm wheel 86 referred to above in connection with the feed rolls has teeth with parallel sides to permit a certain amount of vibration between the flyer worm 83 and the worm wheel 86 to take place if necessary.

The spindles may be closely spaced, for example, the centres may be 2 inches apart.

Having now described the invention, what is claimed as new and desired to secure by Letters Patent is:—

1. Apparatus for spinning, doubling and twisting comprising a spindle and resilient bearings therefor arranged within and co-operating with a flyer, resilient bearings coacting with bearings on the flyer which is balanced to such a degree that in normal operation the bearing surfaces on the flyer will not maintain contact with their coacting bearing surfaces, and at least three balancing masses disposed on said flyer in individual planes containing the longitudinal axis of the flyer, the angle between any adjacent pair of said planes being less than 180° and the circle of rotation of every individual mass being non-coincident with the circle of rotation of any other of said masses.

2. In a machine for spinning, doubling and twisting fibrous materials as claimed in claim 1, a flyer which is balanced to such a degree that the flyer does not actually contact with the bearing surfaces of its bearing tube whilst the machine is in normal operation.

3. Apparatus for spinning, doubling and twisting fibrous materials according to claim 1 including a flyer balanced to the degree specified and mounted in a form of resilient or spring-supported bearing comprising two parts namely an outer cage and an inner tube, air bearings for supporting the flyer in the inner tube and resilient means for supporting the inner tube in the cage.

4. Apparatus for spinning, doubling and twisting fibrous materials according to claim 1 including a flyer balanced to the degree specified and mounted in a form of resilient or spring-supported bearing comprising two parts namely an outer cage and an inner tube, air bearings for supporting the flyer in the inner tube and resilient means for supporting the inner tube in the cage, the said inner tube being furnished with two bearings surfaces.

5. Apparatus for spinning, doubling and twisting fibrous materials according to claim 1 including a flyer balanced to the degree specified and mounted in a form of resilient or spring-supported bearing comprising two parts namely an outer cage and an inner tube, air bearings for supporting the flyer in the inner tube and resilient means for supporting the inner tube in the cage, the said inner tube being formed from electrode-posited copper.

6. Apparatus for spinning, doubling and twisting fibrous materials according to claim 1 including a flyer balanced to the degree specified and mounted in a form of resilient or spring-supported bearing comprising two parts namely an outer cage and an inner tube, air bearings supporting the flyer in the inner tube and resilient means supporting the inner tube in the cage, the said inner tube being formed from electrode-posited copper and furnished with two carbonaceous bearing surfaces.

7. Apparatus for high speed spinning, doubling and twisting as claimed in claim 1, including a flyer formed of electro-deposited metal.

8. Apparatus for high speed spinning, doubling and twisting as claimed in claim 1, including a flyer formed of electro-deposited copper.

GERTRUDE RUTH ZIANI DE FERRANTI,
*Executrix of the Estate of Sebastian Ziani de Ferranti, Deceased.*